(12) United States Patent
Figlioli et al.

(10) Patent No.: US 6,609,727 B2
(45) Date of Patent: Aug. 26, 2003

(54) ENERGY ABSORBING KNEE BOLSTER ASSEMBLY

(75) Inventors: Dan William Figlioli, Macomb Township, MI (US); Thomas E Yott, Rochester Hills, MI (US); Tanzetta D Copelyn, Grand Blanc, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/921,669

(22) Filed: Aug. 6, 2001

(65) Prior Publication Data

US 2003/0025314 A1 Feb. 6, 2003

(51) Int. Cl.$^7$ ............................................ B60R 21/045
(52) U.S. Cl. ........................................................ 280/752
(58) Field of Search .................................. 280/748, 750, 280/751, 752; 296/189, 35.2; 188/371, 376, 377

(56) References Cited

U.S. PATENT DOCUMENTS

| | | | | |
|---|---|---|---|---|
| 3,715,130 A | * | 2/1973 | Harada et al. .............. | 280/738 |
| 3,930,665 A | * | 1/1976 | Ikawa ......................... | 280/752 |
| 4,194,762 A | * | 3/1980 | Sudo .......................... | 280/751 |
| 4,373,746 A | * | 2/1983 | Okuyama .................... | 280/752 |
| 5,201,544 A | * | 4/1993 | Matano et al. .............. | 280/751 |
| 5,395,133 A | * | 3/1995 | Lauritzen et al. ........... | 280/732 |
| 5,632,507 A | * | 5/1997 | Sinner et al. ............... | 280/751 |
| 5,951,045 A | * | 9/1999 | Almefelt et al. ............ | 280/748 |
| 5,961,182 A | * | 10/1999 | Dellanno ............... | 297/216.12 |
| 6,145,880 A | | 11/2000 | White et al. ................ | 280/752 |

* cited by examiner

Primary Examiner—Paul N. Dickson
Assistant Examiner—David R. Dunn
(74) Attorney, Agent, or Firm—Laura C. Hargitt

(57) ABSTRACT

An energy absorbing knee bolster assembly for a vehicle includes a knee deflector for partially surrounding a steering column of the vehicle. The energy absorbing knee bolster assembly also includes left and right energy absorbing knee bolster brackets on opposite sides of the knee deflector. The knee deflector and the energy absorbing knee bolster brackets are integral, unitary, and one-piece.

16 Claims, 3 Drawing Sheets

ENERGY ABSORBING KNEE BOLSTER ASSEMBLY

TECHNICAL FIELD

The present invention relates generally to knee bolsters for vehicles and, more particularly, to an energy absorbing knee bolster assembly for a vehicle.

BACKGROUND OF THE INVENTION

It is known to provide a vehicle interior with a knee bolster assembly that straddles a steering column at a location below a steering wheel and generally on a lower portion of an instrument panel for a vehicle such as an automotive vehicle. Typically, the knee bolster is designed to absorb the impact of an occupant's knees during a forward collision as a means of supplementing seat belts and other occupant restraints.

An example of such a knee bolster assembly is disclosed in U.S. Pat. No. 6,145,880 to White et al. In this patent, the knee bolster assembly includes a central bracket adapted for partially surrounding the steering column and a foam element mounted on the central bracket. The knee bolster assembly also includes left and right knee brackets mounted on opposite sides of the central bracket. The knee brackets each have a generally D-shaped cross-section including a convex rear wall positionable adjacent a vehicle driver occupant such that upon loading by the vehicle driver occupant, the knee brackets deform about multiple, nonspecific bend lines for absorption of energy. The knee brackets preferably include inner and forward walls rigidly secured to the central bracket and outer and rear walls that significantly deform for absorption of energy. The central bracket and knee brackets are separate parts formed as three progression steel stampings.

Although the above knee bolster assembly has worked, it is desirable to provide a new knee bolster assembly for a vehicle. It is also desirable to provide a knee bolster assembly having a thermoplastic knee deflector and energy absorbing knee bolster brackets. It is further desirable to provide a knee bolster assembly that has a thermoplastic knee deflector and energy absorbing brackets that use a one-piece design. Therefore, there is a need in the art to provide an energy absorbing knee bolster assembly for a vehicle that meets these desires.

SUMMARY OF THE INVENTION

It is, therefore, one object of the present invention to provide a new energy absorbing knee bolster assembly for a vehicle.

It is another object of the present invention to provide an energy absorbing knee bolster assembly for a vehicle that has a thermoplastic knee deflector and energy absorbing knee bolster brackets.

It is yet another object of the present invention to provide an energy absorbing knee bolster assembly that has a one-piece design.

To achieve the foregoing objects, the present invention is an energy absorbing knee bolster assembly for a vehicle. The energy absorbing knee bolster assembly includes a knee deflector for partially surrounding a steering column of the vehicle. The energy absorbing knee bolster assembly also includes left and right energy absorbing knee bolster brackets on opposite sides of the knee deflector. The knee deflector and energy absorbing knee bolster brackets are integral, unitary, and one-piece.

The energy absorbing knee bolster assembly has a one-piece design that replaces three steel stampings in the current manufacturing process. The energy absorbing knee bolster assembly also allows for tuning the stiffness of the knee deflector by including gas assisted tubes to stiffen the knee deflector. The energy absorbing characteristics of the knee deflector may be tuned by altering or varying the wall thickness of these tubes by the amount and pressure of the gas injected during the molding process without requiring a tooling change. The energy absorbing knee bolster assembly may have several different stiffness parts that can be produced in the same tool to allow the parts to be evaluated to obtain the best femur loads for a given vehicle pulse. Further, the energy absorbing knee bolster assembly eliminates three progression steel stampings with one injection molding tool and provides a tunable part for energy absorption, without tooling changes. The energy absorbing knee bolster assembly requires only the process of gas assisting and foam durometer to adjust the stiffness of the assembly. The knee bolster brackets are filled with frangible foam to increase the crush force required and to allow the brackets to be tuned to the vehicle crash pulse by varying the durometer of the foam, allowing the stiffness to be altered without changing the tool.

Other objects and features of the present invention will be readily appreciated, as the same becomes better understood, after reading the subsequent description taken in conjunction with the accompanying drawings.

DESCRIPTION OF THE PREFERRED EMBODIMENT

Figure 1:
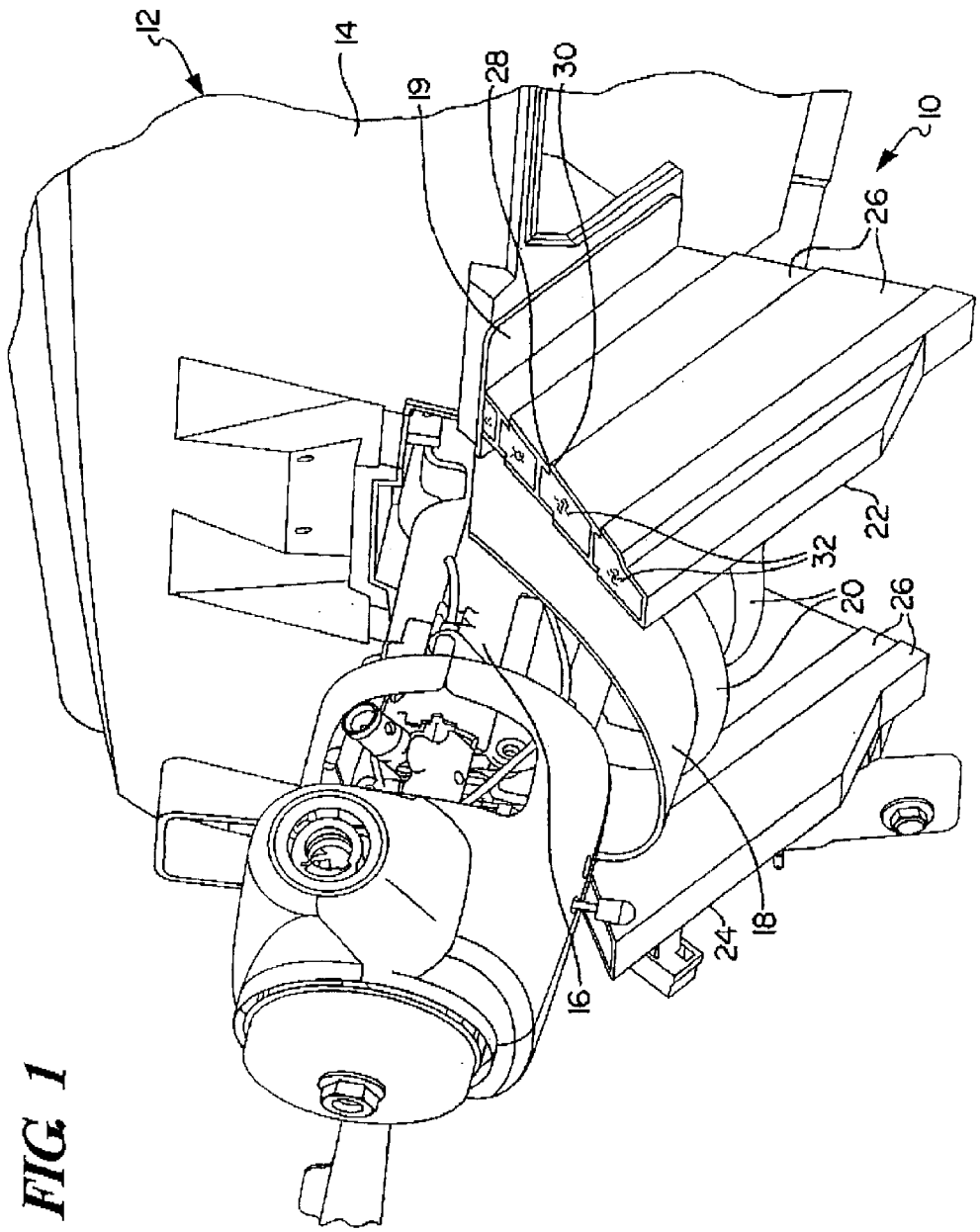
FIG. 1 is a right perspective view of an energy absorbing knee bolster assembly, according to the present invention, illustrated in operational relationship with a vehicle.

Referring to the drawings, one embodiment of an energy absorbing knee bolster assembly 10, according to the present invention, is shown for a vehicle such as an automotive vehicle, generally indicated at 12. The vehicle 12 includes an instrument panel 14 positioned in front of vehicle occupants (not shown) in an occupant compartment thereof. The vehicle 12 also includes a steering column 16 extending below the instrument panel 14 and into the occupant compartment to support a steering wheel (not shown). A vehicle driver occupant's knees are typically straddled on either side of the steering column 16. The steering column 16 is attached to a rigid steering column bracket (not shown). The instrument panel 14 may include other underlying rigid vehicle structure onto which the energy absorbing knee bolster assembly 10 may be mounted for supplemental protection of the lower extremities of the vehicle driver occupant. In FIG. 1, the location of the energy absorbing knee bolster assembly 10 is for a vehicle driver's side application. It should be appreciated that, except for the energy absorbing knee bolster assembly 10, the vehicle 12 is conventional and known in the art.

Figure 2:
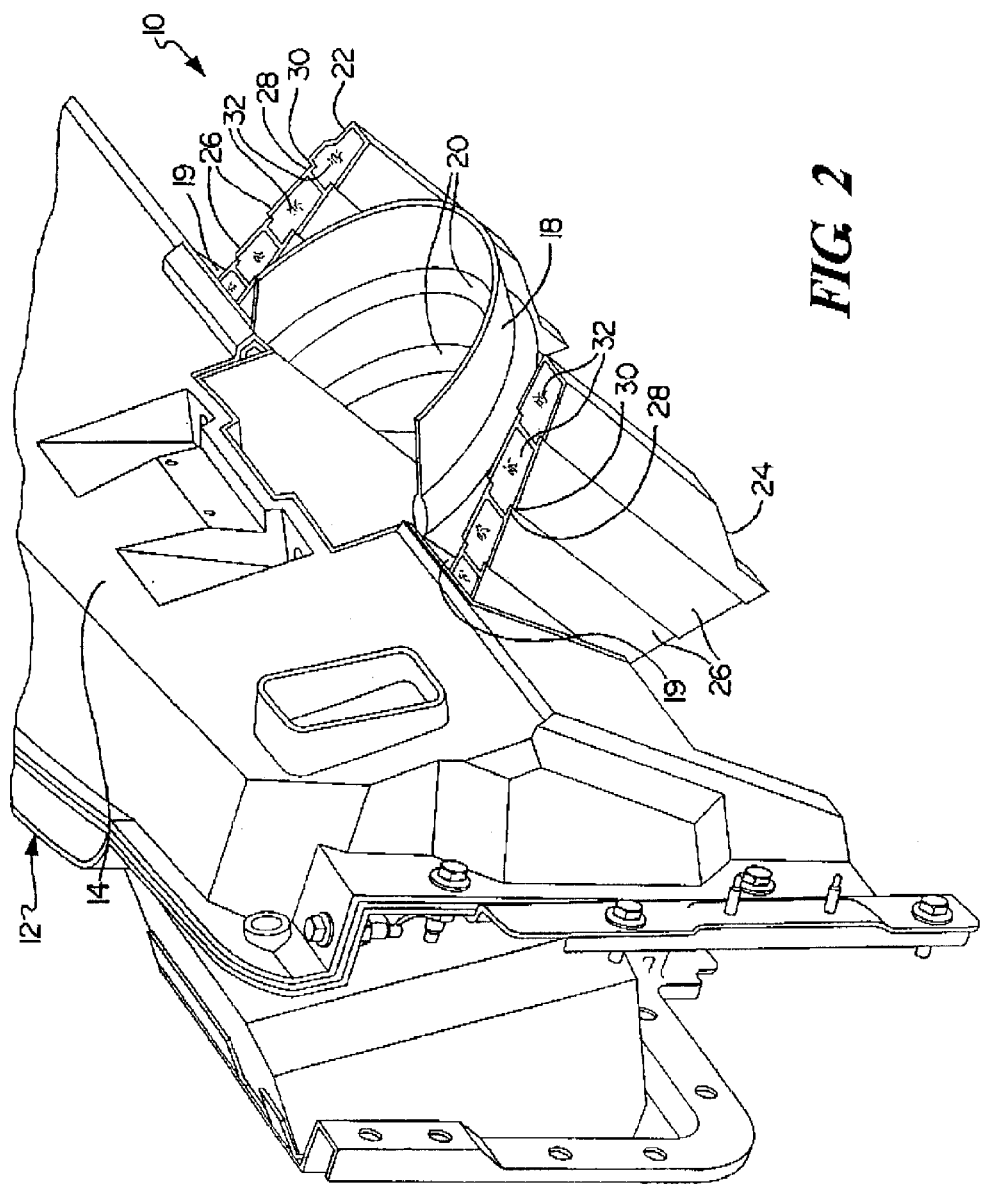
FIG. 2 is a left perspective view of the energy absorbing knee bolster assembly of FIG. 1 with a portion of the vehicle removed.
Figure 3:
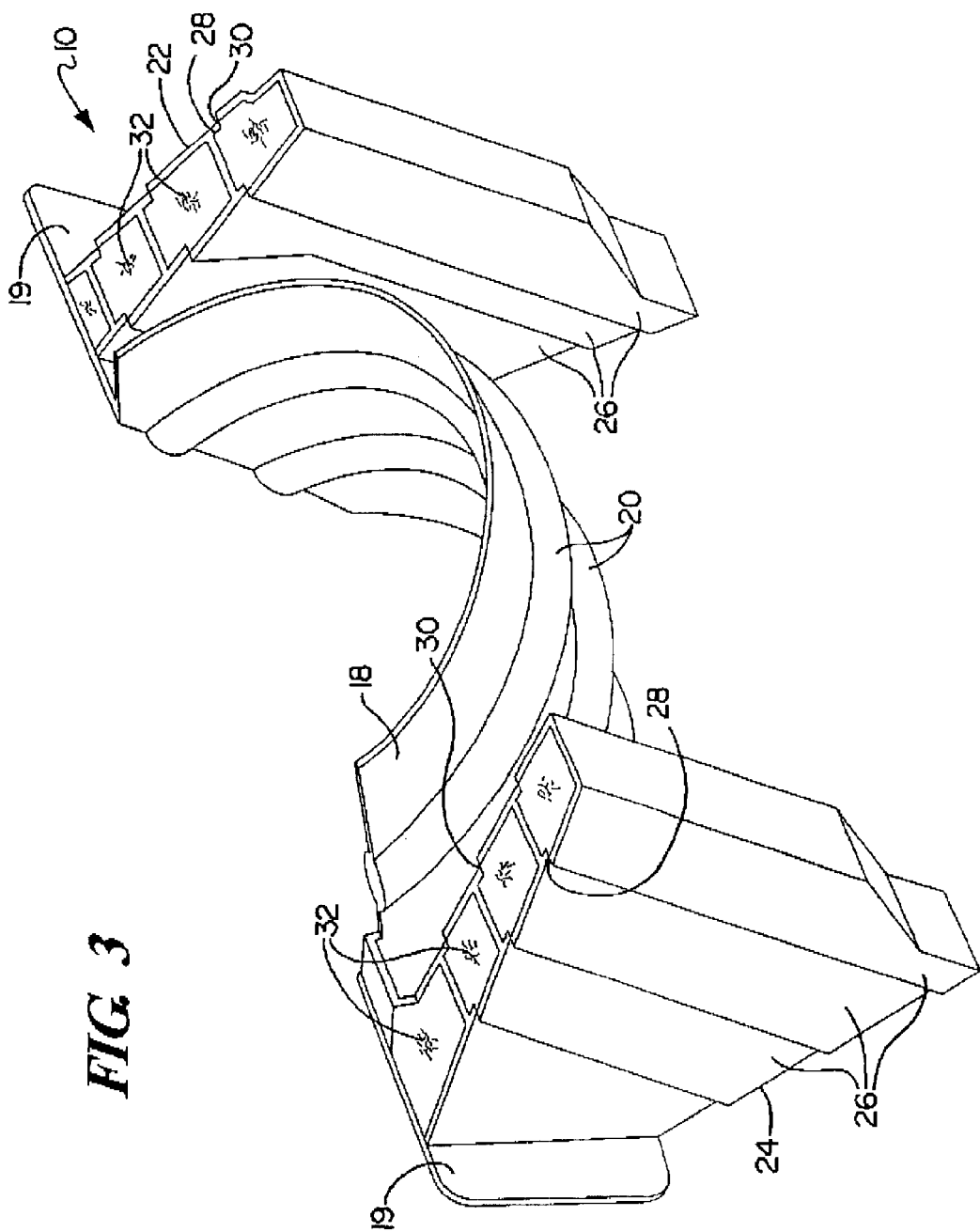
FIG. 3 is a perspective view of the energy absorbing knee bolster assembly of FIG. 1 with the vehicle removed.

Referring to FIGS. 1 through 3, the energy absorbing knee bolster assembly 10 includes a thermoplastic knee deflector 18. The knee deflector 18 extends laterally and vertically. The knee deflector 18 is preferably generally C-shaped having flanges 19 at the ends thereof extending laterally. The flanges 19 are attached to the instrument panel 14 by suitable means such as fasteners (not shown). The knee deflector 18 includes at least one, preferably, a plurality of tubes 20 extending laterally and spaced vertically. The tubes 20 are gas assisted or filled with gas to provide a means of tuning the stiffness of the knee deflector 18 and to stiffen the knee deflector 18. The wall thickness of the tubes 20 can be varied by the amount and pressure of the gas injected during a molding process. The knee deflector 18, flanges 19, and tubes 20 are integral, unitary, and formed as one-piece from a thermoplastic material such as polypropylene. It should be appreciated that the knee deflector 18, flanges 19 and tubes 20 are molded from the thermoplastic material by conventional gas-assisted injection molding which is conventional and known in the art.

The energy absorbing knee bolster assembly 10 also includes right and left energy absorbing knee bolster brackets 22 and 24 extending from the knee deflector 18. The brackets 22 and 24 are spaced laterally and located at the lateral ends of the knee deflector 18. The brackets 22 and 24 extend longitudinally from the flanges 19 of the knee deflector 18. Each of the brackets 22 and 24 have a plurality of sections 26 being generally hollow and rectangular in cross-sectional shape. The sections 26 extend generally vertically. The sections 26 have a collapse initiator on either one or both longitudinal ends. The collapse initiator is either a recess 28 or a projection 30 at each lateral edge extending longitudinally and vertically to form a stepped configuration. The projections 30 are received in the recesses 28 and the recesses 28 and projections 30 cooperate with each other. It should be appreciated that the recesses 28 and projections 30 of the brackets 22 and 24 are of a molded design to allows the sections 26 to fracture and collapse on each other to insure that the energy absorbed is not returned to the occupant of the vehicle during a vehicle impact.

The brackets 22 and 24, knee deflector 18, and tubes 20 are integral, unitary, and formed as one-piece from a thermoplastic material such as polypropylene. It should be appreciated that the brackets 22 and 24, knee deflector 18, and tubes 20 are molded from the thermoplastic material by conventional gas-assisted injection molding which is conventional and known in the art.

The energy absorbing knee bolster assembly 10 further includes a frangible foam 32 disposed inside the sections 26 of the brackets 22 and 24. The foam 32 is made of a plastic material such as polystyrene. The foam 32 has a durometer of approximately 60 D. The foam 32 increases the crush force required for the brackets 22 and 24 and to allow the brackets 22 and 24 to be tuned to the vehicle crash pulse by varying the durometer of the foam 32. It should be appreciated that the foam 32 allows the stiffness of the brackets 22 and 24 to be altered. It should also be appreciated that the knee deflector 18 and brackets 22 and 24 are made of a one-piece design that replaces three steel stampings.

In operation of the energy absorbing knee bolster assembly 10, during impact, the knee deflector 18 will deform and deflect laterally. The tubes 20 provide a tuned stiffness to the knee deflector 18 to provide a predetermined amount of deflection. The sections 26 of the brackets 22 and 24 fracture and collapse on each other to insure that the energy absorbed is not returned to the occupant of the vehicle during a vehicle impact.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An energy absorbing knee bolster assembly for a vehicle comprising:

a knee deflector for partially surrounding a steering column of the vehicle and having opposed flanges extending laterally for attachment to vehicle structure; and left and right energy absorbing knee bolster brackets on opposite sides of said knee deflector and extending longitudinally from said flanges, wherein said knee deflector and said energy absorbing knee bolster brackets are made of a thermoplastic material and are integral, unitary, and one-piece, said energy absorbing knee bolster brackets being collapsible during a vehicle impact.

2. An energy absorbing knee bolster assembly as set forth in claim 1 wherein said knee deflector includes at least one tube extending laterally therealong.

3. An energy absorbing knee bolster assembly as set forth in claim 2 wherein said at least one tube is filled with a gas.

4. An energy absorbing knee bolster assembly as set forth in claim 1 including a foam disposed within said energy absorbing knee bolster brackets.

5. An energy absorbing knee bolster assembly as set forth in claim 4 wherein said foam is a frangible foam.

6. An energy absorbing knee bolster assembly as set forth in claim 1 wherein each of said energy absorbing knee bolster brackets comprise a plurality of sections.

7. An energy absorbing knee bolster assembly as set forth in claim 6 wherein said sections have at least one collapse initiator therein.

8. An energy absorbing knee bolster assembly for a vehicle comprising:

a knee deflector for partially surrounding a steering column of the vehicle;

left and right energy absorbing knee bolster brackets on opposite sides of said knee deflector, wherein said knee deflector and said energy absorbing knee bolster brackets are integral, unitary, and one-piece;

wherein each of said energy absorbing knee bolster brackets comprises a plurality of sections;

wherein said sections have at least one collapse initiator therein; and wherein said at least one collapse initiator comprises a projection and a recess on adjacent said sections, said projection being received in said recess.

9. An energy absorbing knee bolster assembly for a vehicle comprising:

a knee deflector for partially surrounding a steering column of the vehicle and having opposed flanges extending laterally for attachment to vehicle structure, said knee deflector including a plurality of tubes extending therealong; and left and right energy absorbing knee bolster brackets on opposite sides of said knee deflector and extending longitudinally from said flanges, wherein said knee deflector and said energy absorbing knee bolster brackets are made of a thermoplastic material and are integral, unitary, and one-piece, said energy absorbing knee bolster brackets being collapsible during a vehicle impact.

10. An energy absorbing knee bolster assembly as set forth in claim 9 wherein said tubes are filled with a gas.

11. An energy absorbing knee bolster assembly as set forth in claim 9 including a foam disposed within said energy absorbing knee bolster brackets.

12. An energy absorbing knee bolster assembly as set forth in claim 11 wherein said foam is a frangible foam.

13. An energy absorbing knee bolster assembly as set forth in claim 9 wherein each of said energy absorbing knee bolster brackets comprise a plurality of sections.

14. An energy absorbing knee bolster assembly as set forth in claim 13 wherein each of said sections have at least one collapse initiator therein.

15. An energy absorbing knee bolster assembly for a vehicle comprising:
- a knee deflector for partially surrounding a steering column of the vehicle, said knee deflector including a plurality of tubes extending therealong;
- left and right energy absorbing knee bolster brackets on opposite sides of said knee deflector, wherein said knee deflector and said energy absorbing knee bolster brackets are integral, unitary, and one-piece;
- wherein each of said energy absorbing knee bolster brackets comprises a plurality of sections;
- wherein each of said sections have at least one collapse initiator therein; and
- wherein said at least one collapse initiator comprises a projection and recess on adjacent said sections, said projection being received in said recess.

16. An instrument panel assembly for a vehicle comprising:
- an instrument panel;
- a knee bolster assembly attached to said instrument panel; and
- said knee bolster assembly comprising a knee deflector for partially surrounding a steering column of the vehicle and having opposed flanges extending laterally and attached to said instrument panel and left and right energy absorbing knee bolster brackets on opposite sides of said knee deflector and extending longitudinally torn said flanges, wherein said knee deflector and said energy absorbing knee bolster brackets are made of a thermoplastic material and are integral, unitary, and one-piece, said energy absorbing knee bolster brackets being collapsible during a vehicle impact.

\* \* \* \* \*